United States Patent [19]

Reinwall et al.

[11] Patent Number: 4,630,984
[45] Date of Patent: Dec. 23, 1986

[54] ASSEMBLY FOR FASTENING A LAYER OF COMPRESSIBLE MATERIAL TO A RIGID MEMBER

[75] Inventors: Ernest W. Reinwall, McHenry; John Spibey, Rockford, both of Ill.

[73] Assignee: Elco Industries, Inc., Rockford, Ill.

[21] Appl. No.: 574,570

[22] Filed: Jan. 27, 1984

[51] Int. Cl.$^4$ .................................. F16B 43/00
[52] U.S. Cl. ..................... 411/368; 411/533
[58] Field of Search ............ 411/368, 531, 371, 372, 411/533, 545, 546, 396; 52/410, 408, 404

[56] References Cited

U.S. PATENT DOCUMENTS

| | | | |
|---|---|---|---|
| 1,885,761 | 11/1932 | Peirce . | |
| 1,953,592 | 4/1934 | Deniston | 85/28 |
| 2,488,796 | 11/1949 | Baier | 114/201 |
| 2,538,396 | 1/1951 | Sutin | 411/908 X |
| 2,778,399 | 1/1957 | Mroz | 151/35 |
| 2,943,373 | 7/1960 | Rapata | 411/908 X |
| 3,316,861 | 5/1967 | Dailey | 411/908 X |
| 4,114,509 | 9/1978 | Poe | 411/60 |
| 4,292,007 | 9/1981 | Wagner | 411/533 X |
| 4,361,997 | 12/1982 | DeCaro | 52/512 |
| 4,380,413 | 4/1983 | Dewey | 411/161 |
| 4,391,559 | 7/1983 | Mizusawa | 411/60 X |
| 4,435,112 | 3/1984 | Becker | 411/368 |

FOREIGN PATENT DOCUMENTS

| | | |
|---|---|---|
| 7614572 | 9/1976 | Fed. Rep. of Germany . |
| 2359309 | 2/1978 | France ........................... 411/337 |
| 1027641 | 4/1966 | United Kingdom ............... 411/542 |

OTHER PUBLICATIONS

Sketch of disk manufactured by The Tru-Fast Corp., Bryan, Ohio.

Primary Examiner—Gary L. Smith
Assistant Examiner—Adrian H. Whitcomb, Jr.
Attorney, Agent, or Firm—Leydig, Voit & Mayer, Ltd.

[57] ABSTRACT

An assembly for fastening a compressible layer of insulation includes a threaded screw projecting through the center of a flat circular disk of a resilient plastic material. A central hub on the disk is received between the head and a flange spaced below the head to hold the disk adjacent the head, the hub being defined in part by resilient fingers which flex outwardly to let the flange pass through the hub as the screw and the disk are assembled together. An annular surface is formed on the underside of the disk at the periphery thereof to engage the insulation and ribs which decrease in width are formed on the underside of the disk and project radially from the hub to the peripheral surface so that an uplift force causes the disk to flex upwardly progressively from the periphery toward the center.

2 Claims, 5 Drawing Figures

ASSEMBLY FOR FASTENING A LAYER OF COMPRESSIBLE MATERIAL TO A RIGID MEMBER

BACKGROUND OF THE INVENTION

This invention relates to an assembly for fastening a layer of compressible material to a rigid member such as a layer of insulation to a roof deck and, more particularly, to an assembly which includes a metal fastener such as a screw projecting through the center of a resilient disk. The screw projects through the compressible layer and is threaded into the rigid member so that the head of the screw holds the disk down against the compressible layer. In the case of a roof, a waterproof membrane covers the insulation layer as well as the disks.

Uplift forces such as may result from wind tend to lift the insulation and the disk and this appreciably reduces the effectiveness of prior disks in holding the compressible layer down. Also, with prior assemblies, a downward force such as may be caused by walking on a roof causes the disk to slide down on the screw with the result that the membrane often is punctured by the screw head.

SUMMARY OF THE INVENTION

The general object of the invention is to provide a new and improved assembly of the foregoing type which, as compared with prior assemblies, is more effective in holding the compressible layer down even under relatively high uplift conditions and which, when used with a roof, reduces the possibility of the membrane being punctured.

A more detailed object is to provide the disk with a novel arrangement of ribs on its underside so that an uplift force causes the disk to flex with the flexing beginning at the periphery and progressing inwardly as the force increases.

Another object is to avoid puncturing a membrane by providing the screw with a flange spaced beneath the head and by forming the disk with a resiliently expandable hub which expands to pass over the flange during assembly and then abuts the flange to hold the disk near the head of the screw.

The invention also resides in the details of the construction of the ribs and the hub.

DETAILED DESCRIPTION OF THE PREFERRED EMBODIMENT

Figure 1:
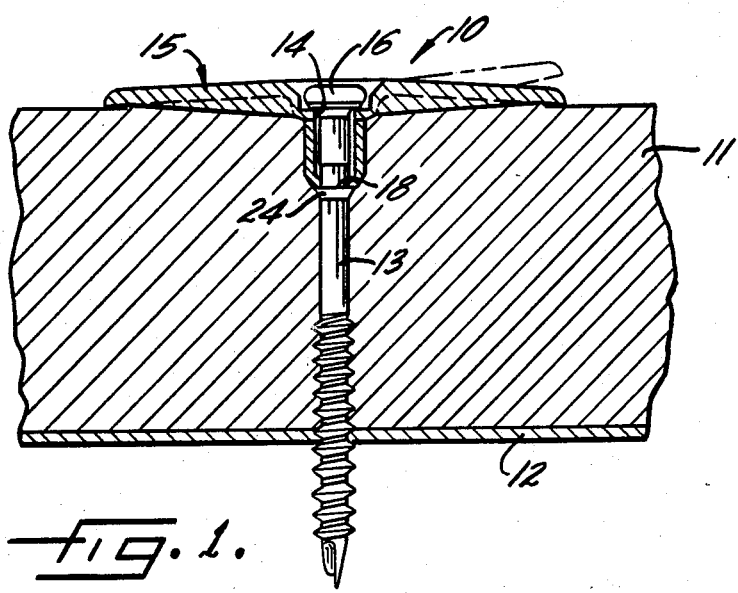
FIG. 1 is a sectional view of a roof construction utilizing a fastener assembly embodying the present invention.
Figure 2:
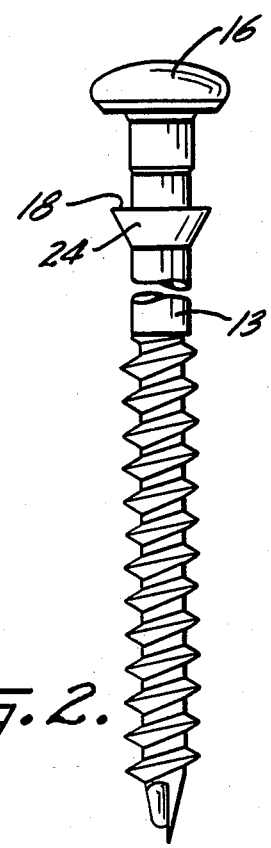
FIG. 2 is an enlarged side elevational view of the screw used in the assembly.

As shown in the drawings for purposes of illustration, the invention is embodied in an assembly 10 for fastening a layer 11 of compressible insulation material to a base member 12 which herein is a sheet metal roof deck. The assembly 10 includes a metal fastener 13 in the form of a screw inserted through a hole 14 in the center of a circular disk 15. The disk is on top of the insulation 11 and is engaged by the head 16 on the upper end of the fastener, the latter projecting down through the insulation and being threaded into the roof deck so that the underside of the disk bears downwardly against the top of the insulation. The disk is made of a resiliently flexible material such as molded polypropylene. Usually, a waterproof covering membrane (not shown) is laid on top of the insulation layer 11 and also covers the disks.

Installations such as this encounter various conditions which can be destructive. For example, wind passing over a roof creates an uplift condition which tends to separate the insulation 11 from the roof deck 12 and lift the insulation together with the membrane. The disks 15 are used to oppose this lifting force. In addition, downward forces applied to the roof, as by a person walking on it, compress the insulation. Often, the disks and the membrane move down with the insulation but the fastener 13 does not and this can cause the membrane to rupture over the head 16 of the fastener.

The present invention contemplates the provision of a new and improved assembly 10 which, as compared to prior arrangements, is more effective to hold the insulation down even under comparatively high wind uplift conditions and which keeps the disk 15 near the head 16 of the fastener 13 even under downward forces to protect the membrane against rupturing. To these ends, the disk is constructed in a novel manner so that it flexes upwardly under an uplift force and this flexing starts at the periphery of the disk on one side and progresses inwardly as the force increases so that the remainder of the disk holds the insulation down. Also, the disk is formed with a resiliently expandable hub 17 which coacts with the head 16 and a shoulder 18 on the fastener to keep the disk at the head even when a downward force is applied to the disk.

Figure 3:
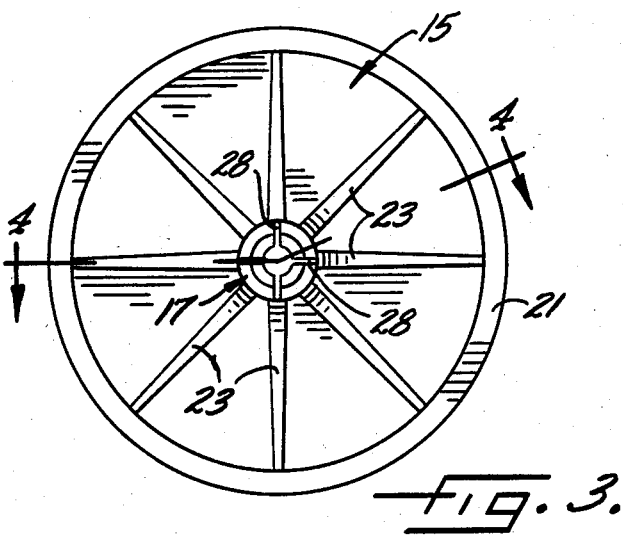
FIG. 3 is a bottom view of the disk.
Figure 5:
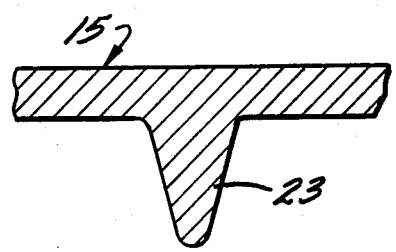
FIG. 5 is an enlarged fragmentary sectional view taken along the line 5—5 in FIG. 4.
Figure 4:
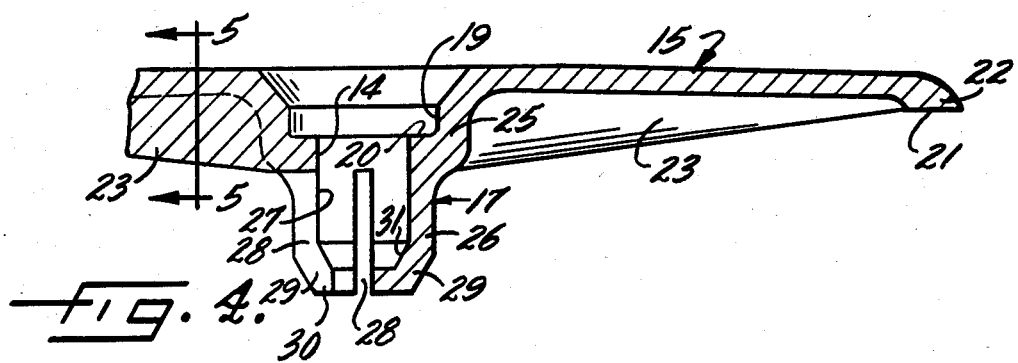
FIG. 4 is an enlarged fragmentary sectional view taken along the line 4—4 in FIG. 3.

Herein, the top of the disk 15 is recessed around the hole 14 as indicated at 19 (FIG. 4) so that the head 16 of the fastener 13 is beneath the upper surface of the disk and an upwardly facing shoulder 20 is formed around the bottom of the recess to be engaged by the head and prevent the fastener from passing completely through the hole. To engage the insulation firmly while still being resiliently yieldable, the disk is flat and is formed with a flat downwardly facing annular surface 21 (FIGS. 3 and 4) around the periphery of its underside so that it is essentially this surface which engages the insulation. Preferably, this surface is the underside of a short annular flange 22 projecting down from the disk along its periphery. A controlled flexing of the disk is achieved through the provision of a plurality of ribs 23 which are formed on the underside of the disk and project radially outwardly from the central portion of the disk to the flange. The ribs are comparatively narrow at the flange and become progressively wider toward the center of the disk so as to provide increasing resistance to upward flexing of the disk. Herein, there are eight such ribs and the ribs become wider or thicker in the axial direction and are V-shaped in cross section as illustrated in FIG. 5. With this arrangement, upward force on one side, such as on the right side as viewed in FIG. 1, bends this side upwardly as illustrated in broken lines. With a small uplift force, this bending is restricted to the area adjacent the edge of the disk and, as the uplift force increases, the bending progresses radially inwardly but meets increasing resistance due to the widening of the ribs 23.

In order to keep the disk 15 at the head 16 of the screw 13 while maintaining simplicity of construction and ease of assembly, the screw is formed with the upwardly facing shoulder 18 which is spaced beneath the head and the disk includes the axial hub 17 which fits between the head and the shoulder. The hub is resiliently expandable to permit the shoulder to pass through it as the screw is assembled into the hole 14 and the hub is slightly less in length than the space between the head and the shoulder to fit into and remain in this space. Herein, the shoulder 18 is the upper surface of a flange 24 on the shank of the screw and the flange is tapered inwardly below the shoulder so as to produce a camming action in expanding the hub. The latter is formed on the underside of the disk and includes an enlarged upper portion 25 (FIG. 4) which merges with the ribs 23. Beneath this upper portion, the hub is reduced in diameter as indicated at 26 and the insides of the portions 25 and 26 are formed with a bore 27 which is a continuation of the hole 14, the bore being larger in diameter than the shank of the screw 13 but smaller than the head 16. In the form illustrated, the hub is made expandable by forming a plurality of longitudinal slots 28, herein four, in the hub portion 26 with the slots extending down through the lower end of the hub. Thus, as defined by the slots, the lower portion of the hub is made up of four flexible fingers 29 which may be resiliently spread apart to allow the flange 24 to pass between them. The lower ends of the fingers are formed with inwardly projecting lips 30 which fit snugly around the shank of the screw and rest on the shoulder 18. The upper surfaces 31 of the lips are inclined upwardly and outwardly to serve as cam followers which coact with the flange 24 in flexing the fingers 29 outwardly.

With the foregoing arrangement, the screw 13 is inserted point first through the hole 14 in the disk 15 from the upper side of the latter. As the flange 24 engages the surface 31 on the lips 30 of the fingers 29, it cams the fingers outwardly. When the flange passes beyond the hub 17, the fingers snap in over the flange and abut the shoulder 18. As a result, the hub is held at the top of the screw between the head 16 and the flange 24. When the screw is threaded through the layer 11 of insulation and the roof deck 12, therefore, the disk 15 stays at the head of the screw even when there is a downward pressure on the roof and this protects the integrity of the sealing membrane. As explained earlier, the disk when in place bends progressively with an increasing uplift force and this insures that the disk holds the insulation layer down even when there is such a force.

We claim:

1. An assembly for fastening together a stack of flat generally horizontal members including a layer of compressible material and a rigid member underlying the layer, said assembly comprising a disk made of a resiliently flexible material and having a central hole, an annular flange formed integrally with and depending from the underside of said disk adjacent the periphery thereof and having a downwardly facing surface defining a contact pad engageable with said stack to apply downward pressure thereto around an annular sealing band, an elongated fastener projecting through said hole and adapted to project down through said layer, the lower end portion of said fastener being threaded to be driven into said rigid member, a head formed on the upper end of said fastener to engage the upper side of said disk, an annular hub formed integrally with said disk and projecting downwardly from the underside thereof, said hub being coaxial with said hole to surround the upper end portion of said fastener and being of sufficient length to project downwardly a substantial distance below said disk and into said layer, the upper end portion of said hub being joined continuously to said disk around the entire circumference of the hub, the lower end portion of said hub being formed with downwardly opening longitudinally extending slots to define angularly spaced fingers which flex to enable the hub to expand, the lower ends of said fingers being located in a substantially horizontal plane, and a collar formed on said fastener above said threaded lower end portion and having an upper end providing an upwardly facing shoulder spaced downwardly from the underside of said head, said collar having a side surface which tapers downwardly from the periphery of said shoulder to cam said fingers apart and permit said collar to pass through said hub as said fastener is inserted through said hole, said shoulder being located completely below all portions of said disk so as to be located within said layer, said shoulder being located in a substantially horizontal plane and being spaced from said head a distance generally equal to the length of said hub to squarely engage the lower ends of said fingers and to hold the disk adjacent said head, the substantially horizontal shoulder and the lower ends of said fingers constituting means configured to keep the disk adjacent the head of the fastener regardless of whether the fastener rotates in either direction relative to the disk after the fastener is inserted through said hole in said hub.

2. An assembly according to claim 1, said disk further having a plurality of ribs formed on the underside of said disk and extending radially outwardly from said hole to said flange, said ribs being comparatively narrow at said flange and progressively increasing in width toward said hole whereby an upward force at the periphery of said disk flexes the disk progressively inwardly toward the hole.

* * * * *